(12) United States Patent
Diochon et al.

(10) Patent No.: US 7,770,840 B2
(45) Date of Patent: Aug. 10, 2010

(54) ENGINE ASSEMBLY FOR AIRCRAFT

(75) Inventors: Lionel Diochon, Toulouse (FR); Isabelle Petrissans, Toulouse (FR); Guillaume Seguin, Le Havre (FR)

(73) Assignee: Airbus France, Toulouse (FR)

( * ) Notice: Subject to any disclaimer, the term of this patent is extended or adjusted under 35 U.S.C. 154(b) by 274 days.

(21) Appl. No.: 11/572,003

(22) PCT Filed: Aug. 1, 2005

(86) PCT No.: PCT/FR2005/050638

§ 371 (c)(1),
(2), (4) Date: Jan. 12, 2007

(87) PCT Pub. No.: WO2006/021722

PCT Pub. Date: Mar. 2, 2006

(65) Prior Publication Data

US 2007/0205323 A1 Sep. 6, 2007

(30) Foreign Application Priority Data

Aug. 4, 2004 (FR) .................................. 04 51785

(51) Int. Cl.
*B64D 27/00* (2006.01)
(52) U.S. Cl. .......................... 244/54; 244/53 R; 244/55
(58) Field of Classification Search .................. 244/54, 244/53 R, 55
See application file for complete search history.

(56) References Cited

U.S. PATENT DOCUMENTS

| | | | | |
|---|---|---|---|---|
| 3,727,862 A | * | 4/1973 | Kaufhold et al. | 244/54 |
| 4,013,246 A | | 3/1977 | Nightingale | |
| 5,275,357 A | * | 1/1994 | Seelen et al. | 244/54 |
| 5,277,382 A | * | 1/1994 | Seelen et al. | 244/54 |
| 5,303,880 A | * | 4/1994 | Cencula et al. | 244/54 |
| 5,474,258 A | * | 12/1995 | Taylor et al. | 244/54 |
| 5,524,847 A | * | 6/1996 | Brodell et al. | 244/54 |
| 5,620,154 A | * | 4/1997 | Hey | 244/54 |
| 6,059,227 A | * | 5/2000 | Le Blaye et al. | 244/54 |

(Continued)

FOREIGN PATENT DOCUMENTS

EP 1 053 937 11/2000

(Continued)

OTHER PUBLICATIONS

U.S. Appl. No. 11/914,327, filed Nov. 13, 2007, Diochon, et al.

(Continued)

*Primary Examiner*—Timothy D Collins
*Assistant Examiner*—Justin Benedik
(74) *Attorney, Agent, or Firm*—Oblon, Spivak, McClelland, Maier & Neustadt, L.L.P.

(57) ABSTRACT

An engine assembly for aircraft including a turboshaft engine, an attachment strut, and a plurality of engine mounts interposed between the attachment strut and the turboshaft engine. The plurality of engine mounts include two forward mounts arranged in a staggered manner in relation to each other in a vertical direction of the turboshaft engine, the first forward mount configured to assure uniquely taking up of stresses brought to bear along the transversal direction of the turboshaft engine, and the second forward mount configured to assure uniquely taking up of stresses brought to bear along the transversal and vertical directions.

9 Claims, 6 Drawing Sheets

U.S. PATENT DOCUMENTS

| | | | |
|---|---|---|---|
| 6,095,456 A * | 8/2000 | Powell | 244/54 |
| 6,330,995 B1 * | 12/2001 | Mangeiga et al. | 248/554 |
| 6,347,765 B1 * | 2/2002 | Jule et al. | 244/54 |
| 6,398,161 B1 * | 6/2002 | Jule et al. | 244/54 |
| 2002/0104924 A1 * | 8/2002 | Roszak | 244/54 |
| 2007/0138337 A1 * | 6/2007 | Audart-Noel et al. | 244/53 R |
| 2008/0169378 A1 * | 7/2008 | Beaufort et al. | 244/54 |

FOREIGN PATENT DOCUMENTS

| | | |
|---|---|---|
| FR | 2 676 707 | 11/1992 |
| WO | WO 96/11843 | 4/1996 |

OTHER PUBLICATIONS

U.S. Appl. No. 11,632,077, filed Jan. 10, 2007, Diochon, et al.
U.S. Appl. No. 11,572,213, filed Jan. 17, 2007, Diochon, et al.
U.S. Appl. No. 11,571,666, filed Jan. 5, 2007, Diochon, et al.

* cited by examiner

ENGINE ASSEMBLY FOR AIRCRAFT

TECHNICAL FIELD

The present invention concerns in a general manner an engine assembly for aircraft, of the type comprising a turboshaft engine such as a turbojet, an attachment strut, and a plurality of engine mounts interposed between said attachment strut and the turbojet.

STATE OF THE PRIOR ART

In a known manner, the attachment strut of such an engine assembly is provided to constitute the liaison interface between a turbojet and a wing of the aircraft equipped with said assembly. It makes it possible to transmit to the structure of said aircraft the stresses generated by its associated engine, and also allows the routing of fuel, electrical systems, hydraulics, and air between the engine and the aircraft.

In order to assure the transmission of stresses, the strut comprises a rigid structure, for example of the "box" type, in other words formed by the assembly of spars and lateral panels joined together through the intermediary of cross ribs.

An assembly system is interposed between the engine and the rigid structure of the strut, said system comprising in an overall manner a plurality of engine mounts, normally divided up into forward mount(s) integral with the fan casing of the engine and rear mount(s) integral with the delivery casing of said same engine.

Moreover, the assembly system comprises a device for taking up thrust stresses generated by the engine. In the prior art, said device takes for example the form of two lateral connecting rods joined on the one hand to a rear part of the fan casing of the engine, and on the other hand to a mount assembled on the rigid structure of the strut, for example a rear mount.

By way of indication, it is pointed out that the attachment strut is associated with a second assembly system interposed between said strut and the wing of the aircraft, said second system being habitually composed of two or three mounts.

Finally, the strut is provided with a secondary structure assuring the segregation and the support of systems while at the same time supporting aerodynamic fairings.

In the conventional embodiments of the prior art, the assembly system interposed between the turbojet and the rigid structure is generally designed in such a way that the take up of the moment brought to bear along a longitudinal direction of the turbojet is achieved by means of two rear mounts or half-mounts, spaced in a transversal direction of said turbojet and each formed in such a way as to be able to assure the taking up of stresses brought to bear along a vertical direction of said turbojet.

In such a configuration, the spacing between the two rear mounts in the transversal direction is obviously limited by the width of the rigid structure of the strut, which is generally small, particularly for obvious reasons of perturbation of the bypass air.

Consequently, the narrow spacing of the rear mounts implies that the stresses along the vertical direction, which each of said two mounts have to take up in order to assure the take up of the moment along the longitudinal direction, are very high. Thus, the major disadvantage stemming from this observation is that said rear mounts naturally need to be designed in a complex and costly manner.

OBJECT OF THE INVENTION

The aim of the invention is therefore to propose an assembly for aircraft that overcomes at least partially the above mentioned disadvantages relative to the embodiments of the prior art, and further to describe an aircraft having at least one such assembly.

In order to achieve this aim, the object of the invention is an engine assembly for aircraft comprising a turboshaft engine, an attachment strut as well as a plurality of engine mounts interposed between the attachment strut and the turboshaft engine, the plurality of engine mounts comprising two forward mounts each designed in such a way as to assure the taking up of stresses brought to bear along a transversal direction of the turboshaft engine, the two forward mounts being arranged in a staggered manner in relation to each other in a vertical direction of the turboshaft engine. Moreover, the first forward mount is designed in such a way as to assure uniquely the taking up of stresses brought to bear along the transversal direction of the turboshaft engine, whereas the second forward mount is designed in such a way as to assure uniquely the taking up of stresses brought to bear along the transversal and vertical directions.

In other words, the engine assembly according to the invention is formed in such a way that the take up of the moment brought to bear along the longitudinal direction of the turboshaft engine is achieved no longer by means of rear mounts, but through the intermediary of forward mounts staggered in height and capable of assuring the taking up of stresses brought to bear along the transversal direction.

However, since the forward mounts may be made integral with, indiscriminately, a fan casing or a delivery casing of the turboshaft engine, it is then obviously possible to separate them considerably from each other in the vertical direction, for example by mounting one of them on the fan casing, and the other on the delivery casing.

This wide spacing has the advantage of being able to considerably simplify the design of the engine mounts, due to the fact that the stresses that they have to take up, associated with the moment along the longitudinal direction, are naturally weakened compared to those encountered in the conventional solutions of the prior art in which the take up of said moment was assured by two rear mounts made integral with the delivery casing, which obviously could not be separated from each other to such an extent.

It is pointed out that the two forward mounts could both be arranged on the fan casing, at different heights, without going beyond the scope of the invention.

Furthermore, it is pointed out that if the two forward mounts are arranged in a staggered manner in relation to each other in the vertical direction of the turboshaft engine in order to assure the take up of the moment brought to bear along the longitudinal direction, this does not exclude the fact that they may also be staggered in relation to each other in the longitudinal direction and/or in the transversal direction.

Preferably, the two forward mounts consist of a first forward mount integral with a peripheral annular part of the fan casing of the turboshaft engine, and a second forward mount integral with a delivery casing of the turboshaft engine. In this preferred configuration, it is effectively easily possible to obtain a spacing along the vertical direction, between the two forward mounts, which is very high compared to that encountered in the prior art and limited to the width of the rigid structure of the attachment strut.

As has been stated above, the first forward mount is designed in such a way as to assure uniquely the taking up of stresses brought to bear along the transversal direction of the turboshaft engine, whereas the second forward mount is designed in such a way as to assure uniquely the taking up of stresses brought to bear along the transversal and vertical directions. In this case, the plurality of engine mounts may also comprise a rear mount designed in such a way as to assure the taking up of stresses brought to bear along the transversal and vertical directions, as well as along the longitudinal direction of the turboshaft engine.

Preferably, each of the plurality of engine mounts is traversed by a plane defined by a longitudinal axis of the turboshaft engine, and the vertical direction of said engine. Thus, it is clear that the fact of centering all of the engine mounts on the above mentioned plane, and thus not to provide for mounts spaced from each other in the transversal direction, makes it possible to substantially reduce the width of the attachment strut along said same transversal direction. Thus, the reduction in the width observed advantageously makes it possible to reduce the perturbations of the bypass air in the turbofan annular duct, caused by the attachment strut.

Preferentially, the attachment strut comprises a rigid structure comprising a center box extends substantially along the longitudinal direction of the turboshaft engine, as well as a front box integral with the center box and extending substantially along the vertical direction.

In such a case, one may provide that the two forward mounts are assembled in an integral manner, one above the other, on the front box.

Preferably, the first forward mount designed in such a way as to assure uniquely the taking up of stresses brought to bear along the transversal direction of the turboshaft engine comprises an intermediate bracket assembled on a first bracket integral with the attachment strut through the intermediary of two ball jointed axles oriented in parallel along the direction vertical, the first forward mount further comprising a slug oriented along the longitudinal direction of the turboshaft engine and integral with the intermediate bracket, the slug being mounted with play in the longitudinal direction on a second bracket integral with the turboshaft engine.

A further aim of the invention is an aircraft comprising at least one engine assembly such as that which has just been described.

Other advantages and characteristics of the invention will become clearer in the non-limitative detailed description that follows.

BRIEF DESCRIPTION OF DRAWINGS

This description will be made with regard to the appended drawings, among which.

DETAILED DESCRIPTION OF PREFERRED EMBODIMENTS

Figure 1:
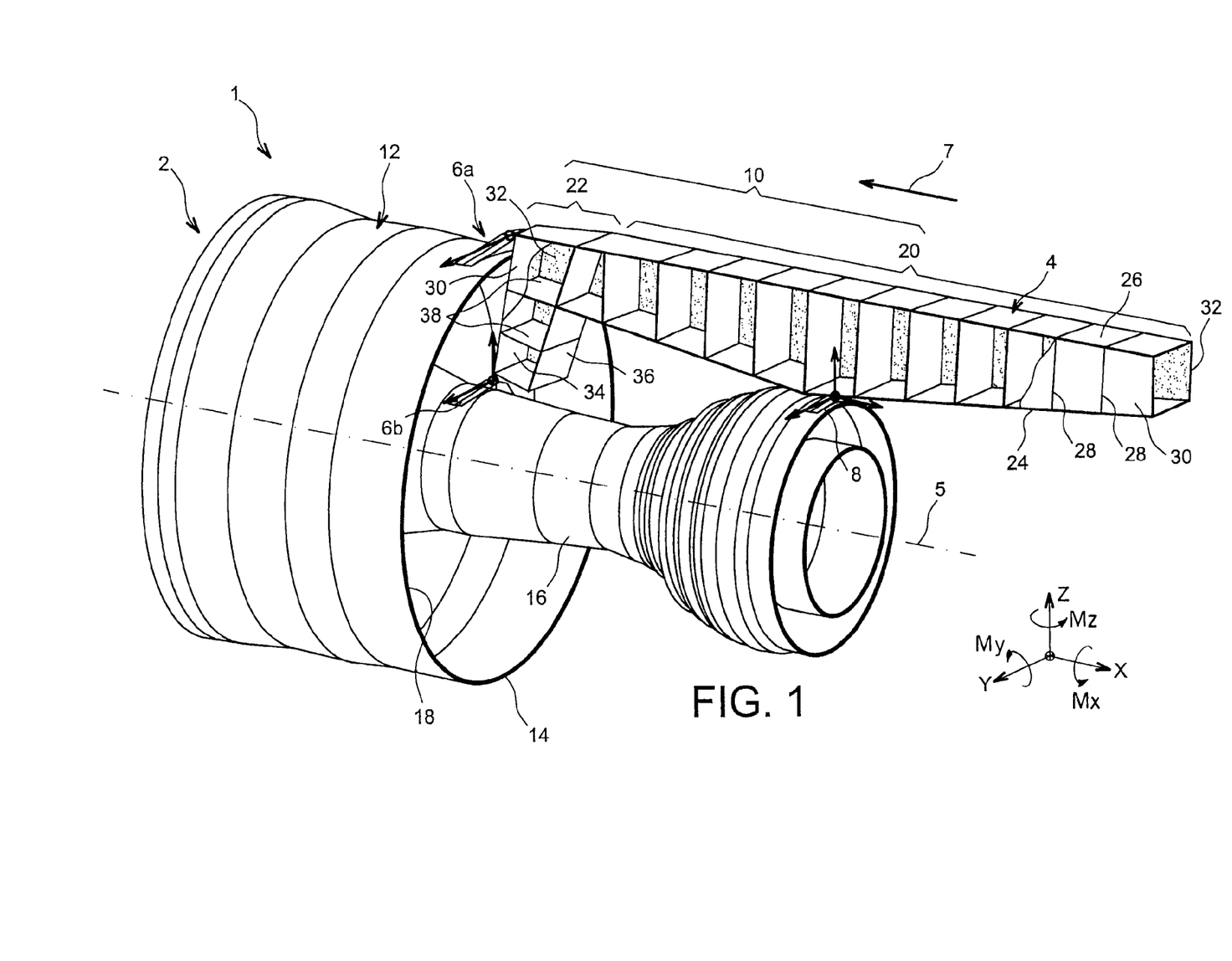
FIG. 1 represents a perspective view of an engine assembly for aircraft, according to a preferred embodiment of the present invention.

In reference to FIG. 1, an engine assembly 1 for aircraft according to a preferred embodiment of the present invention is shown, said assembly 1 being intended to be attached under the wing of an aircraft (not represented).

In an overall manner, the engine assembly 1 comprises a turboshaft engine 2 that will be considered as being a turbojet 2 in the description hereafter, an attachment strut 4, as well as a plurality of engine mounts 6a, 6b, 8 assuring the attachment of the turbojet 2 under said strut 4. By way of indication, it is noted that the assembly 1 is intended to be enclosed within a nacelle (not represented), and that the attachment strut 4 comprises another series of mounts (not represented) that make it possible to assure the suspension of said assembly 1 under the wing of the aircraft.

Throughout the following description, by convention, X is taken to mean the longitudinal direction of the turbojet 2 that is parallel to a longitudinal axis 5 of said turbojet 2, Y the transversal direction of said turbojet 2, and Z the vertical or height direction, these three directions being orthogonal to each other.

Moreover, the terms "forward" and "rear" are to be considered in relation to a direction of progress of the aircraft encountered following the thrust exercised by the turbojet 2, said direction being represented schematically by the arrow 7.

In FIG. 1, it may be seen that only one rigid structure 10 of the attachment strut 4 has been represented. The other non represented elements making up said strut 4, such as the secondary structure assuring the segregation and the maintenance of the systems while at the same time supporting the aerodynamic fairings, are conventional elements identical or similar to those encountered in the prior art, and known to those skilled in the art. Consequently, no detailed description will be made of them.

In the same way, the assembly 1 is equipped with a device (not represented) for taking up thrust stresses generated by the turbojet 2, which is identical or similar to those encountered previously, and which will therefore not be described further.

The turbojet 2 has at the front a fan casing 12 of large dimensions delimiting an annular duct of a turbofan 14, and comprises towards the rear a delivery casing 16 of smaller dimensions, enclosing the core of said turbojet. The casings 12 and 16 are obviously integral with each other, in a conventional manner and known in the prior art.

As may be seen in FIG. 1, the particularity of the invention resides in the fact that the plurality of engine mounts 6a, 6b, 8 comprises two forward mounts 6a, 6b each designed in such a way as to assure the taking up of stresses brought to bear along the transversal direction Y, combined with the fact that said two forward mounts 6a, 6b are arranged in a staggered manner in relation to each other in the vertical direction Z.

More precisely, the first forward mount 6a is integral on the one hand with the front of the rigid structure 10 of the strut 4, and on the other hand with a peripheral annular part 18 of the fan casing 12, preferably on the rear of said part 18, as is represented schematically in FIG. 1.

Moreover, said first forward engine mount 6a is mounted on the highest portion of said peripheral annular part 18, implying that it is traversed by an imaginary plane (not represented) defined by the longitudinal axis 5 and the direction Z. In this respect, it is noted that the imaginary plane that has just been mentioned is a symmetry plane for the first forward mount 6a.

As will be detailed hereafter, it is noted that said first mount is designed in such a way as to assure uniquely the taking up of stresses brought to bear along the direction Y of the turbojet, and not along the directions X and Z.

Moreover, the second forward mount 6b is integral on the one hand with the front of the rigid structure 10 of the strut 4, and on the other hand with the delivery casing 16, in such a way that it is thereby situated below the first forward mount 6a. Moreover, said second forward engine mount 6b is mounted on the highest annular portion of the delivery casing 16. In this respect, it is noted that in the preferred embodiment represented, the two forward mounts 6a, 6b are uniquely staggered with respect to each other in the Z direction, and not in the X and Y directions. However, it would obviously have been possible to effect such a staggering, without going beyond the scope of the invention.

Furthermore, this particular positioning of the second mount 6b implies that it is also traversed by the imaginary plane indicated previously and defined by the longitudinal axis 5 and the direction Z, said imaginary plane also constituting a symmetry plane for said second forward mount 6b.

As is represented schematically by the arrows in FIG. 1, the second forward mount 6b is designed in such a way as to assure uniquely the taking up of stresses brought to bear along the direction Y and along the direction Z of the turbojet, but not those brought to bear along the direction X.

The plurality of engine mounts 6a, 6b, 8 further comprises a unique rear mount 8, on which may for example be fastened the device for taking up thrust stresses of the assembly 1. Said rear mount 8 is integral on the one hand with the rear of the delivery casing 16, preferably at the level of a rear end of said casing 16, and on the other hand with the rigid structure 10 of the strut 4, preferably at the level of a part substantially central of said strut considered in the direction X.

In the same way as for the second forward mount 6b, the rear mount 8 is formed according to any form known to those skilled in the art, such as for example that relative to the assembly of shackles and brackets. However, said rear mount 8 is for its part designed in such a way as to assure the taking up of stresses brought to bear along the three directions X, Y and Z.

Consequently, with the plurality of engine mounts that have just been described, the taking up of stresses brought to bear along the direction X is achieved by means of the rear mount 8, that of the stresses brought to bear along the direction Y is achieved by means of three mounts 6a, 6b, 8, and that of the stresses brought to bear along the direction Z is achieved through the intermediary of the first forward mount 6a and the rear mount 8.

Furthermore, the take up of the moment brought to bear along the direction X (Mx) is achieved jointly by means of two forward mounts 6a, 6b, that of the moment brought to bear along the direction Y (My) is achieved jointly by means of the second forward mount 6b and the rear mount 8, and that of the moment brought to bear along the direction Z (Mz) is achieved jointly by means of three engine mounts 6a, 6b, 8.

Figure 2:
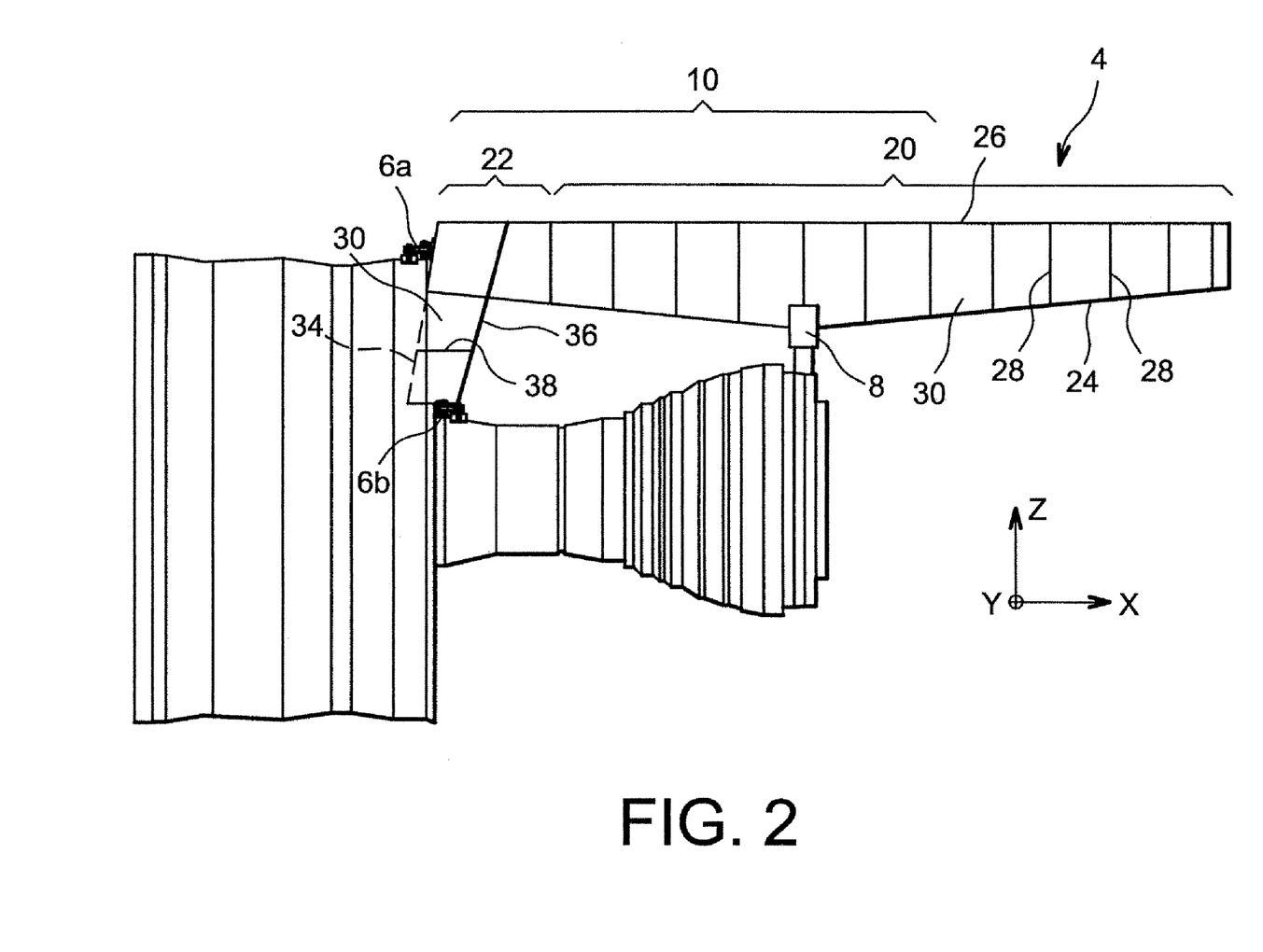
FIG. 2 represents a side view of the engine assembly represented in FIG. 1.

In reference jointly to FIGS. 1 and 2, it may be seen that in the preferred embodiment represented, the rigid structure 10 of the attachment strut 4 comprises a center box 20 extending substantially along the direction X, as well as a front box 22 integral with the center box 20 and extending substantially along the vertical direction Z.

More precisely, the center box 20 located at the rear of the front box 22 is formed by assembling lower 24 and upper 26 spars joined together through the intermediary of cross ribs 28, preferably oriented in the planes YZ. The spars 24 and 26 are, for their part, oriented along the planes XY, or even along planes slightly inclined in relation to said planes. By way of illustration and as may be clearly seen in FIG. 2, the upper spar 26 is effectively situated in a plane XY, whereas a forward part of the lower spar 24 is slightly inclined in such a way as to descend in going towards the rear, and that a rear part of said lower spar 24 is slightly inclined in such a way as to rise in going towards the rear. In this respect, it is at the level of the junction between the forward and rear parts of the lower spar 24, which are both parallel to the direction Y, that the rear mount 8 is assembled on the rigid structure 10.

It is pointed out that the lower spar 24 and the upper spar 26 may each be formed in a single piece, or instead consist of an assembly of several portions of spars rigidly attached to each other.

Furthermore, the center box 20 is preferably closed laterally on either side by two lateral walls 30, 32, which each extend overall in a plane XZ.

An upper part of the front box 22 is located in the forward extension of the center box 20.

In other words, the front box 22 extending substantially along the direction Z has a forward spar 34 and a rear spar 36, which are both parallel to the direction Y, and which are connected to each other through the intermediary of cross ribs 38, preferably oriented in the planes XY. In this respect, it is noted that the highest cross rib 38 is constituted by the forward end of the upper spar 26 of the center box 20, said forward end also assuring an upper closure of the front box 22. In the same way, the second highest cross rib 38 is constituted by the forward end of the lower spar 24 of said center box 20.

Preferably, the front box 22 is closed laterally on either side by the two lateral walls 30, 32 also assuring the lateral closure of the center box 20.

In this way, in the same way as the rigid structure 10 considered as a whole, the two lateral walls 30, 32 each have an overall "L" shape, in which the base of said L is substantially oriented along the direction Z.

Figure 3:
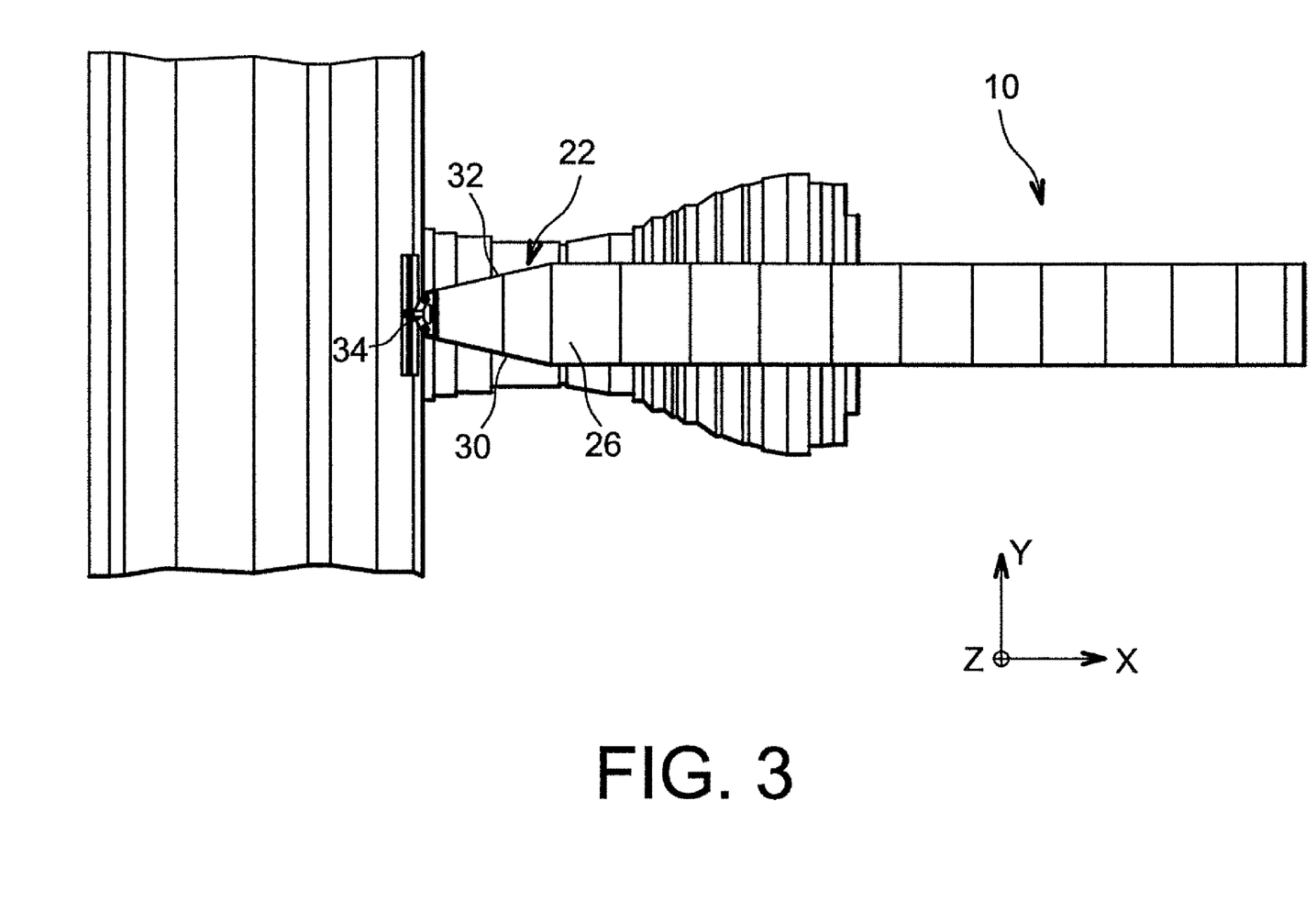
FIG. 3 represents an overhead view of the engine assembly of FIGS. 1 and 2, in which the attachment strut is in the form of an alternative.

As may be seen in FIG. 3 representing the rigid structure 10 of the attachment strut 4 in an alternative form, it is noted that the front box 22 may be formed in such a way that it gets slightly narrower, in the direction Y, going towards the front. Moreover, the forward spar 34 may have a section of a general "C" shape open towards the rear, the two branches of the C then being connected in such a way as to be located respectively in contact and in the continuity of the two edges of the upper spar 26, the narrowed forward shape of which may be obtained by beveling of each of said two same edges. Moreover, each of the branches of the C is also thus located in the continuation of one of the two lateral walls 30, 32, still in such a way as to obtain an aerodynamic continuity between the forward spar 34 and the lateral walls 30, 32.

With this type of narrowed and rounded lay out at the front, the perturbations of the bypass air flowing through the annular duct of the turbofan 14 are advantageously considerably reduced.

As regards the rigid structure 10 of the strut 4, as may be seen most clearly in FIG. 2, it is noted on the one hand that the first forward mount 6a is preferably integral with an upper part of the forward spar 34, which is oriented in a plane YZ, and on the other hand that the second forward mount 6b is preferably integral with the lowest cross rib 38, assuring the lower closure of the front box 22.

Figure 4:
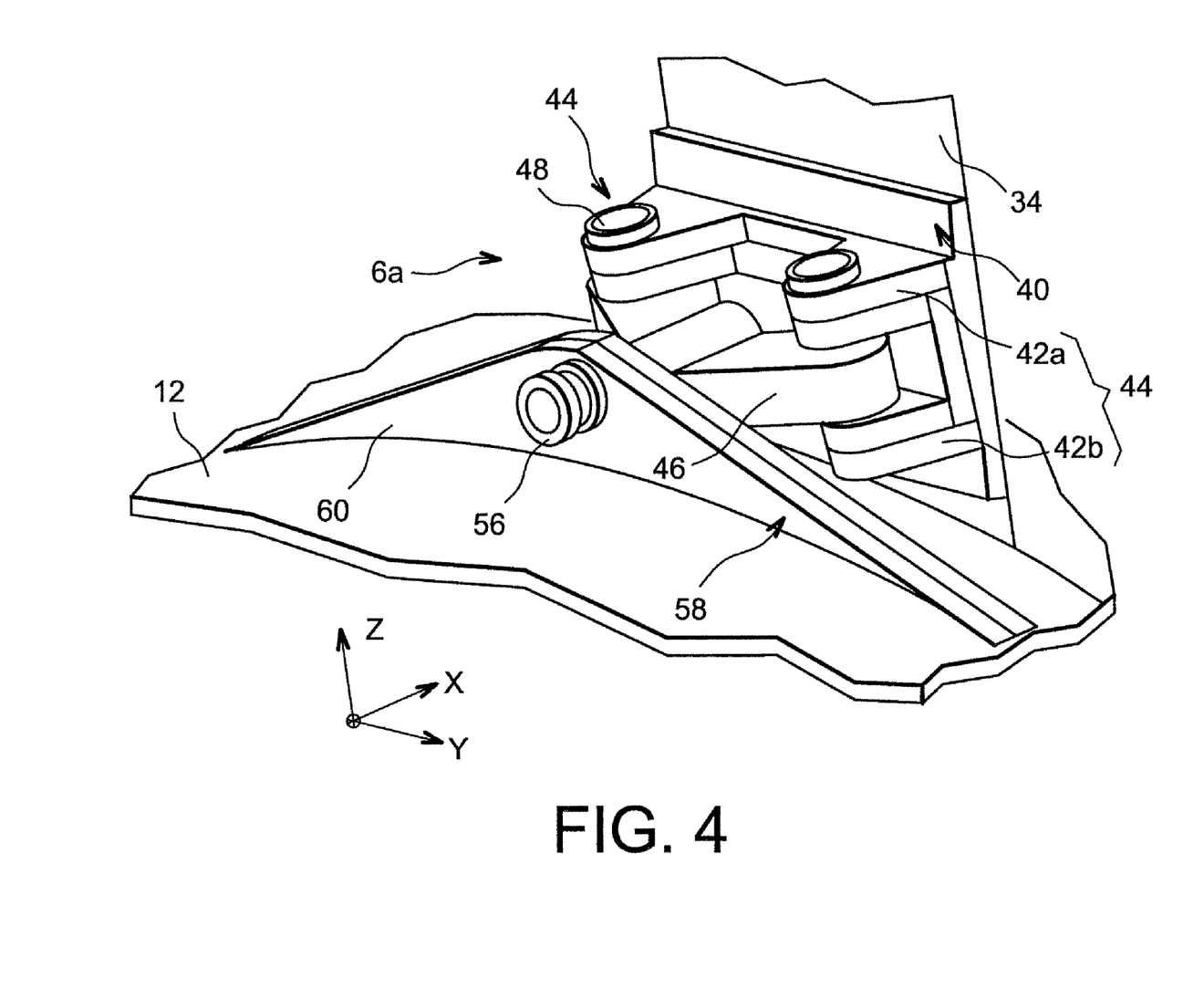
FIG. 4 represents a detailed perspective view of the first forward engine mount of the engine assembly of FIGS. 1 to 3, interposed between the fan casing of the turbojet and the rigid structure of the attachment strut.
Figure 5:
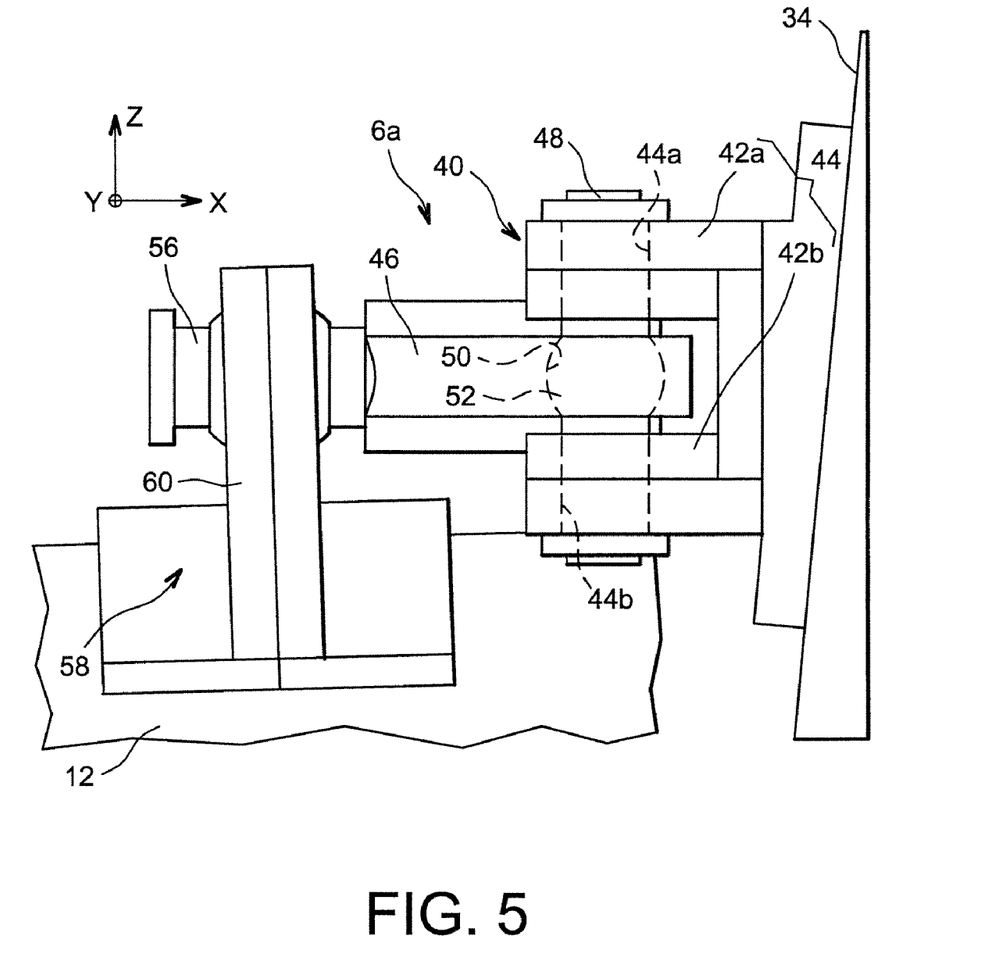
FIG. 5 is a side view of the first forward engine mount represented in FIG. 4.

Now in reference to FIGS. 4 to 6, the first forward mount 6a, uniquely capable of taking up the stresses brought to bear along the direction Y, will now be described.

Said forward mount 6a has firstly a first bracket 40, which may be formed by assembly of several metallic parts, which is integral with the forward spar 34 of the front box 22, and more generally with the rigid structure 10 of the strut 4.

The first bracket 40 has a symmetry in relation to the imaginary vertical plane passing through the longitudinal axis 5 of the turbojet 2, and comprises in particular two pairs of heads 44 respectively arranged on either side of said plane.

Each pair of heads 44 comprises an upper head 42a and a lower head 42b spaced from said head in the direction Z, each of these two heads 42a, 42b may be double and are oriented in a plane XY. Furthermore, the upper head 42a has a through hole 44a oriented along the direction Z, in the same way that the lower head 42b has a through hole 44b also oriented along the direction Z, and located opposite the hole 44a.

Figure 6:
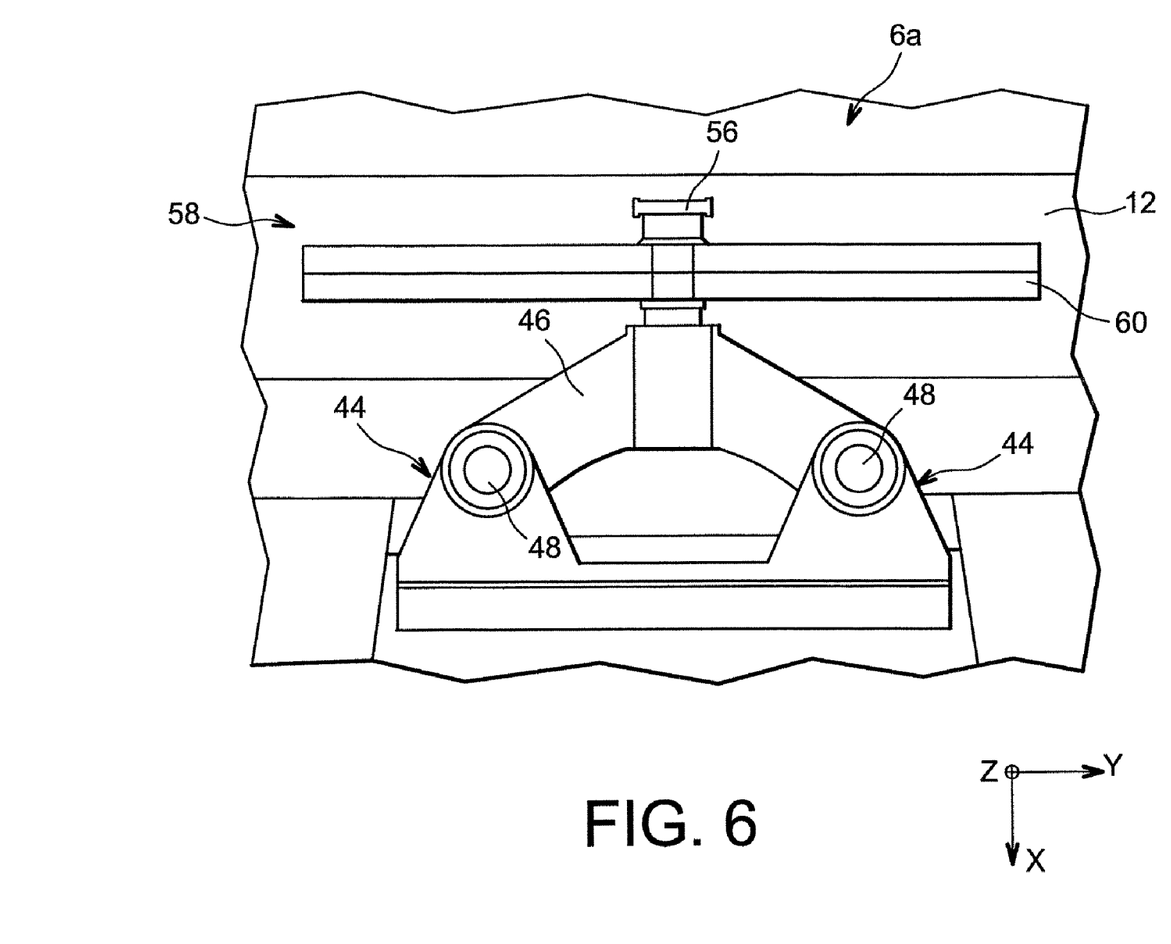
FIG. 6 is an overhead view of the first forward engine mount represented in FIGS. 4 and 5.

An intermediate bracket 46, preferably with a general "V" shape extending in a plane XY as may be seen in FIG. 6, is connected to the first bracket 40 through the intermediary of two ball jointed axles 48 each oriented along the direction Z.

More precisely, each of the two ends of the V shaped intermediate bracket 46 is mounted on one of the two pairs of heads 44 by means of one of the two ball jointed axles 48, implying that said axles are arranged in a symmetrical manner in relation to the above mentioned imaginary plane. In this respect, it is pointed out that said imaginary plane also constitutes a symmetry plane for the intermediate bracket 46.

Thus, at the level of each of the two pairs of heads 44, the axle 48 traverses successively the hole 44a of the upper head 42a, a through hole 50 formed in the end concerned of the intermediate bracket 46, and finally the hole 44b of the lower head 42b. Moreover, the through hole 50 indicated above is adapted to cooperate with a ball joint 52 of the axle 48, as may be seen in FIG. 5.

In this way, it should be understood that the presence of said two axles 48 makes it possible to obtain two ball joint linkages oriented along the direction Z and arranged in a symmetrical manner in relation to the imaginary vertical plane indicated previously.

At the level of the junction of the two branches of the V constituting the intermediate bracket 46, the forward mount 6a comprises a slug 56 oriented along the direction X and integral with said same intermediate bracket 46, the slug 56 being traversed diametrically by the imaginary vertical plane. The assembly constituted by the slug 56 and the intermediate bracket 46 therefore takes the form of a "Y", the lower branch of which is oriented towards the front, along the direction X.

The slug 56 is assembled with play in the direction X on a second bracket 58 integral with the turbojet 2, and more precisely on the upper portion of the peripheral annular part 18 of the fan casing 12.

In other words, the mechanical linkage formed between the slug 56 and the second bracket 58 is of the "monoball" type, namely that it enables, on its own, the take up of stresses brought to bear along the directions Y and Z, whereas play in the direction X is allowed. Consequently, the slug 56 may if necessary slide in a very limited manner in the direction X in relation to a hole (not represented) through which it crosses and which is formed in a head 60 of the second bracket 58, oriented in a plane YZ and which may be double.

The association of the monoball linkage with play along the direction X and the two ball joints oriented along the direction Z thereby leads the first forward mount 6a to take up uniquely the stresses brought to bear along the direction Y of the turbojet 2.

Obviously, various modifications may be those skilled in the art to the engine assembly 1 for aircraft as has just been described, uniquely by way of example and in nowise limitative. In this respect, it should be pointed out in particular that although the engine assembly 1 has been presented in a configuration suitable for it to be suspended under the wing of the aircraft, said assembly 1 could also be in a different configuration allowing it to be assembled above said same wing.

Furthermore, it is naturally conceivable to adopt any other configuration for the mounts 6a, 6b, 8, again providing that the two forward mounts 6a, 6b are each designed in such a way as to assure at least the taking up of stresses brought to bear along a direction Y of the turboshaft engine 2. By way of illustration, the second forward mount 6b may be designed in such a way as to assure the taking up of stresses brought to bear along the three directions X, Y and Z, implying that the rear mount 8 would then be designed in such a way as to assure uniquely the taking up of stresses brought to bear along the direction Y and along the direction Z of the turbojet, but not those brought to bear along the direction X.

The invention claimed is:

1. An engine assembly for aircraft comprising:
    a turboshaft engine having a longitudinal axis defining a longitudinal direction perpendicular to a vertical direction and to a transversal direction, said longitudinal, vertical and transversal directions being orthogonal to each other;
    an attachment strut; and
    a plurality of engine mounts interposed between the attachment strut and the turboshaft engine;
    the plurality of engine mounts comprising first and second forward mounts each configured to transmit forces from said engine to said attachment strut along said transversal direction of the turboshaft engine, the first and second forward mounts being arranged in a staggered manner in relation to each other in a vertical direction of the turboshaft engine,
    wherein the first forward mount is configured to transmit forces from said engine to said attachment strut only along the transversal direction of the turboshaft engine and not along the longitudinal nor the vertical directions, whereas the second forward mount is configured to transmit forces from said engine to said attachment strut only along the transversal and vertical directions and not along the longitudinal direction, and
    wherein the first and second forward mounts are configured to transmit a moment load about the longitudinal axis from said engine to said attachment strut via forces transmitted along said transversal direction of said turboshaft engine.

2. An assembly for aircraft according to claim 1, wherein the first forward mount is integral with a peripheral annular part of a fan casing of the turboshaft engine, and the second forward mount is integral with a delivery casing of the turboshaft engine.

3. An assembly for aircraft according to claim 1, wherein the plurality of engine mounts further comprises a rear mount configured to transmit forces from said engine to said attachment strut along the transversal and vertical directions, and along the longitudinal direction of the turboshaft engine.

4. An assembly for aircraft according to claim 3, wherein each of the plurality of engine mounts is traversed by a plane defined by the longitudinal axis of the turboshaft engine, and the vertical direction of the engine.

5. An assembly for aircraft according to claim 3, wherein said second forward mount is longitudinally positioned between said first forward mount and said rear mount.

6. An assembly for aircraft according to claim 1, wherein the attachment strut comprises a rigid structure comprising a center box extending substantially along the longitudinal direction of the turboshaft engine, and a front box integral with the center box and extending substantially along the vertical direction.

7. An assembly for aircraft according to claim 6, wherein the first and second forward mounts are mounted in an integral manner one above the other on the front box.

8. An assembly for aircraft according to claim 1, wherein the first forward mount comprises an intermediate bracket assembled on a first bracket integral with the attachment strut through the intermediary of two ball jointed axles oriented in parallel along the vertical direction, and a slug oriented along a longitudinal direction of the turboshaft engine and integral with the intermediate bracket, the slug being mounted with play in the longitudinal direction on a second bracket integral with the turboshaft engine.

9. An aircraft comprising at least one engine assembly according to claim 1.

* * * * *